Patented May 13, 1947

2,420,477

UNITED STATES PATENT OFFICE 2,420,477

PRODUCTION OF BUTADIENE BY METHOD OF DEHYDRATION

William J. Hale, Midland, Mich., and Harry Miller, Columbia, Mo., assignors, by direct and mesne assignments, to National Agrol Company, Inc., Washington, D. C., a corporation of Delaware No Drawing. Application November 12, 1942, Serial No. 465,391

6 Claims. (Cl. 260—681)

This invention relates to a method for dehydrating, and more particularly to a method of using a composite dehydrative and coupling catalyst.

This application is a continuation-in-part of our copending application Serial No. 451,320, filed July 17, 1942.

Among the objects of this invention may be noted the provision of a method for dehydrating; the provision of a method for dehydrating by means of a catalyst; the provision of a method for dehydrating catalytically at lower temperatures than hitherto have been possible; and the provision of methods for dehydration and dealcoholation which may be carried out with substantially no production of undesired by-products. Other objects will be in part obvious and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

The catalyst of the present invention performs a two-fold function, namely, the simple dehydration of oxoalkanes and oxoalkenes and coupling the resulting products with other organic compounds.

The catalyst of the present invention is of a compound character. One of the constituents is an acidic anhydride or anhydrides of one or more of the metals of family A of both groups V and VI of the periodic system of elements. These metals are vanadium, columbium, tantalum, chromium, molybdenum, tungsten and uranium. The anhydrides of these metals constitute the starting point for preparing especially active dehydrative oxides. Reduction of these acidic anhydrides by hydrogen or other reducing agents yields respectively lower oxides of approximately the following composition:

$V_2O_3\pm$, $Cb_2O_3\pm$, $TaO_2\pm$, $Cr_2O_3\pm$, $Mo_2O_3\pm$, $W_2O_5\pm$ and $UO_2\pm$, provided the dehydrating conditions, such as the temperature, are not too drastic. Even at a temperature of 500° C. molybdenum, and at a temperature of 1050° C. tungsten, in metallic form may make their appearance. The partially reduced oxides have definite dehydrative characteristics. The metals themselves of groups V and VI are unsuitable.

The reduced dehydrative oxides are provided with a base metal with which they are held in combination. This base metal holds the reduced acid anions in a definite structure important to their dehydrative activity. Among the base metals which may be employed are the following: Beryllium, magnesium, zinc, cadmium, aluminum, thallium, tin, lead, bismuth and alloys of two or more of these.

In Serial No. 451,320 we have shown the effect of the inclusion in the catalyst of a number of refractory acid oxides capable of forming polyacid anions with the acidic anhydrides above referred to. The polyacid anions such as silicotungstic, phosphomolybdic and many others offer high resistance to prolonged reducing action of hydrogen and other reducing agents, so that oxygen still remains associated with the active catalytic agents. The oxygen is diminished only to the point where the structure of the molecule is definitive of enhanced dehydrative (hydrative) activity on the part of the catalyst. The presence of these refractory oxides contributes substantially to the rigidity of the catalytic mass, even though reduction has been carried out at temperatures as high as 1000° C.

A composite catalyst as above described presents a strong and persistent lattice structure underlain by a refractory type of oxide. It presents in addition a storehouse of potential deoxidation from within; the excess of base metal or their alloys serve as reduction reserves.

Among the refractory oxides particularly serviceable within the purview of the present invention may be noted the oxides of boron, silicon, titanium, zirconium, cerium and the rare earth metals, thorium and phosphorus.

An additional component for the catalyst which is desirable, although not essential, is a metal which may be characterized as of the noble or near-noble type. Among these are copper, silver, gold, mercury, ruthenium, rhodium, palladium, osmium, iridium, and platinum, all of which function as dehydrogenative (hydrogenative) agents. When these metals as cations are brought into combination with the dehydrative anions (containing the elements of family A of both groups V and VI referred to above), and the resulting compounds are reduced in a current of hydrogen or by means of another reducing agent, there is obtained an unusually active condensative catalyst.

Similarly, the above-mentioned refractory oxides can unite with the cations of the dehydrogenative (hydrogenative) metals to give salts partially reducible by hydrogen or other reducing agents to a point where condensative activity of the compound is marked and stable. Likewise, these refractory oxides prevent any too great a reduction of such compounds to the point where the dehydrogenative metals are liberated. As long as there is sufficient refractory oxide to hold these dehydrogenative metals in combination, heating under drastic reducing conditions is substantially completely unable to remove the dehydrogenative metal from such compounds. A compound of lower oxidized form is, however, obtained.

Accordingly, by coordinate combination of a refractory oxide or a mixture of several refractory oxides with the dehydrative acidic oxides and the oxides of dehydrogenative metals, followed by partial reduction, a composition is obtained which is stable even to prolonged reduction at red heat and which will exhibit both dehydrative and condensative activity. The formula for an exemplary compound before reduction may be illustrated as follows:

$$Cu \cdot O \cdot WO \cdot O \cdot ZrO \cdot O \cdot WO \cdot Cu$$

In accordance with the present invention therefore a compound catalyst is provided which has a rigid structure, and which functions both as a highly active dehydrator (hydrator) and likewise as a condensator or coupler, the active components of which are embedded in a storage house of reductor. The catalyst may be distributed over an inert carrier, if desired, but this is in no way essential.

The embodiment of the present catalyst containing dehydrogenative metals and their salts inhibits markedly any undesirable end-to-end condensations involving aldehyde itself as, for example, aldol condensations. This is true even though relatively higher temperatures, especially those above 200° C., are utilized. Such temperatures have a tendency to favor aldol type condensations, but such condensations are repressed by the presence of dehydrogenative metals.

In general the catalyst is prepared by mixing the base metal, preferably in granular form, with one or more of the refractory oxides, one or more of the acidic anhydrides of metals of groups V and group VI of the periodic table and, if desired with one or more dehydrogenative metals or compounds of such metals. The whole is then well triturated and roasted to the point of incipient fusion of the base metal, usually 400–800° C., cooled, and further subjected to the reducing action of a reducing agent, when desirable. The refractory oxides should be present in sufficient amount to hold the dehydrogenative metal in combination and to prevent by the formation of polyacid anions complete reduction of the catalyst.

The following examples are illustrative only.

*Example 1*

To 100 parts of a base metal such as 20-mesh granular aluminum, are added 1–2 parts of freshly precipitated silicic acid, 2 parts of tantalum pentoxide, 8 parts of tungstic anhydride, and 5 parts of cupric oxide (in the form of its nitrate). The whole is then well triturated and roasted to a point of approximately 650° C., cooled and then subjected to the reducing action of hydrogen at approximately 300° C. The catalyst is then ready for use.

*Example 2*

To 100 parts of an alloy composed of 3 parts of aluminum and 1 part of magnesium in the form of 20-mesh granules are added 1–2 parts of freshly precipitated silicic acid, 2 parts of tantalum pentoxide, 8 parts of tungstic anhydride and 5 parts of cupric oxide (in the form of its nitrate). The whole is then triturated and roasted to approximately 450° C., cooled, and then subjected to the reducing action of hydrogen at approximately 300° C.

*Example 3*

To 100 parts of 20-mesh granular zinc are added 1–2 parts of freshly precipitated silicic acid, 2 parts of columbium pentoxide, 8 parts of tungstic anhydride and 5 parts of cupric oxide (in the form of its nitrate). The whole is then well triturated and roasted to a point of approximately 425° C., cooled, and then subjected to the reducing action of hydrogen at approximately 300° C.

*Example 4*

100 g. of the catalyst, prepared as in Example 1, were placed in a combustion tube of about ⅛″ internal diameter, and the temperature of the catalyst was brought to approximately 185–195° C. The vapors of 10 g. of vinyl ethyl ether with 5 liters of ethylene (an excess) were passed through the tube during the course of twenty minutes. There was found in the receiver 3.8 g. of butadiene which is about a 50% conversion, together with alcohol and about one-half of the vinyl ethyl ether (unacted upon).

The reaction may be interpreted as follows:

$$CH_2=CH-O-C_2H_5 + HCH=CH_2 \rightarrow$$
$$CH_2=CH-CH=CH_2 + HOC_2H_5$$

The temperature of the reaction should be held below the point where ethyl alcohol tends to dehydrate into ethylene, but a small amount of such dehydration will not evolve sufficient water to distort the course of the reaction through hydrolysis of the vinyl ethyl ether into vinyl alcohol (acetaldehyde) and ethyl alcohol. The present catalyst therefore carries out at low temperatures a reaction which has hitherto been considered to require drastic conditions such as direct cracking of vinyl ethyl ether or its parent, acetaldehyde diethyl acetal, at a temperature of about 360° C. Such drastic treatment involves the production likewise of a large proportion of hydrocarbon residues.

The present catalyst may be utilized for a wide variety of dehydrative (hydrative) reactions with or without coupling. For example, it may be used to form butadiene from acetaldehyde and ethylene or acetal and ethylene.

The reaction is in general carried out at a temperature below 200° C. and may reach a temperature as low as 125° C. It should not exceed approximately 250° C.

*Example 5*

100 g. of catalyst prepared as described in Example 1 were set up in a tube in a furnace, as described in Example 4. The vapors of 20 g. of acetaldehyde diethyl acetal, together with 5 liters of ethylene were passed over the catalyst at 185–195° C. during the course of thirty minutes. There was recovered from the receiver 4.5 g. of butadiene which calculates to about a 50% conversion, together with alcohol, vinyl ethyl ether and unacted upon acetal.

*Example 6*

Example 5 was repeated, using a feed made up of 10 g. of acetaldehyde diethyl acetal (also known as ethylidene diethyl ether) and 10 g. of vinyl ethyl ether, together with 5 liters of ethylene. From the distillate was recovered 7 g. of butadiene, calculating to about a 58% conversion, together with alcohol and vinyl ethyl ether with scarcely a trace of acetal. Recycling of the residual products after removal of the alcohol and in admixture with an equal quantity of fresh acetal before dilution with ethylene lead to the highly favorable over-all yield of butadiene of 85–90% of the theoretical.

By the use of the catalyst described it is possible by using ordinary acetal, that is, acetaldehyde diethyl acetal, to bring acetaldehyde itself into the sphere of reaction with ethylene without the elimination of a water molecule which so readily leads to undesirable decompositions and complex reactions. Elimination of the alcohol molecule is easily accomplished. The reaction shown is very favorable to high yields of pure butadiene which dissolves readily in vinyl ethyl ether when the latter is especially cooled, and easily vaporizes therefrom when brought to room temperatures.

The reaction which occurs is probably a metathetical interaction between vinyl ethyl ether and ethylene to give butadiene with the liberation of alcohol. On the other hand, it may be considered as the dealcoholization of the vinyl ethyl ether formed to carry it over into pure acetylene, followed by reaction of the ethylene and acetylene to give butadiene. It may be represented as follows:

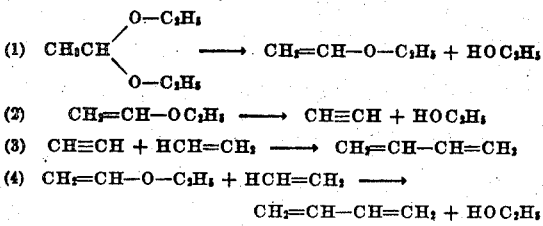

(2) $CH_2=CH-OC_2H_5 \longrightarrow CH\equiv CH + HOC_2H_5$ (3) $CH\equiv CH + HCH=CH_2 \longrightarrow CH_2=CH-CH=CH_2$ (4) $CH_2=CH-O-C_2H_5 + HCH=CH_2 \longrightarrow$
$CH_2=CH-CH=CH_2 + HOC_2H_5$ At lower temperatures the evidence does not indicate the presence of acetylene. The fact that at the same temperature the acetal is broken down no further than into vinyl ethyl ether and is likewise resolved into butadiene by interaction with ethylene, would point to the absence of the acetylene equations given above.

It should be emphasized that the above reactions take place in the absence of water and at temperatures which should not exceed approximately 250° C. A temperature of operation as low as 125° C. is frequently desirable.

A complete reaction may be regarded, if desired, as taking place in five stages. The first of these may involve the dehydration of ethyl alcohol at approximately 300° C. into ethylene and water. This may be accomplished in the customary manner. The second stage may be dehydrogenation of ethyl alcohol through copper tubes at 300° C. into acetaldehyde and hydrogen. The third stage may be the acetalization of acetaldehyde by combination with alcohol. The fourth stage and fifth stage may be the dealcoholization of the acetal in the presence of ethylene obtained from the first stage to the final butadiene.

It has been found that when operating at higher than atmospheric pressures the relative proportion of ethylene which enters into reaction with the vinyl ethyl ether is substantially increased.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

We claim:

1. The method of making butadiene which comprises reacting vinyl ethyl ether with ethylene at a temperature between 125° C. and 250° C. in the presence of a catalyst comprising a core of a metal selected from the group consisting of beryllium, magnesium, zinc, cadmium, aluminum, and alloys thereof, said core being coated with a partially reduced oxide of a metal from family A of groups V and VI of the periodic system.

2. The method of making butadiene which comprises reacting vinyl ethyl ether with ethylene at a temperature between 185° C. and 195° C. in the presence of a catalyst comprising a core of a metal selected from the group consisting of beryllium, magnesium, zinc, cadmium, aluminum, and alloys thereof, said core being coated with a partially reduced oxide of a metal from family A of groups V and VI of the periodic system.

3. The method of preparing butadiene which comprises reacting acetaldehyde diethyl acetal, vinyl ethyl ether and ethylene at a temperature between 185° C. and 195° C. in the presence of a catalyst comprising a core of a metal selected from the group consisting of beryllium, magnesium, zinc, cadmium, aluminum, and alloys thereof, said core being coated with a partially reduced oxide of a metal from family A of groups V and VI of the periodic system at a temperature between approximately 185–195° C.

4. The method of making butadiene which comprises reacting vinyl ethyl ether with ethylene at a temperature between 125° C. and 250° C. in the presence of a catalyst comprising a core of a metal selected from the group consisting of beryllium, magnesium, zinc, cadmium, aluminum, and alloys thereof, said core being coated with a partially reduced oxide of a metal from family A of groups V and VI of the periodic system.

5. The method of making butadiene which comprises reacting vinyl ethyl ether with ethylene at a temperature between 185° C. and 195° C. in the presence of a catalyst comprising a core of a metal selected from the group consisting of beryllium, magnesium, zinc, cadmium, aluminum, and alloys thereof, said core being coated with a partially reduced oxide of a metal from family A of groups V and VI of the periodic system.

6. The method of making butadiene which comprises reacting vinyl ethyl ether with ethylene at a temperature between 125° C. and 250° C. in the presence of a catalyst comprising a core of a metal selected from the group consisting of beryllium, magnesium, zinc, cadmium, aluminum, and alloys thereof, said core being coated with a partially reduced oxide of a metal from family A of groups V and VI of the periodic system, a refractory acid oxide and a metal selected from the group consisting of copper, silver, and gold, at a temperature not substantially in excess of 250° C.

WILLIAM J. HALE.
HARRY MILLER.

REFERENCES CITED

The following references are of record in the file of this patent:

UNITED STATES PATENTS

| Number | Name | Date |
|---|---|---|
| 2,204,157 | Semon | June 11, 1940 |
| 2,241,792 | Reppe et al. | May 13, 1941 |
| 2,297,424 | Maximoff et al. | Sept. 29, 1942 |
| 1,218,332 | Stern | Mar. 6, 1917 |

FOREIGN PATENTS

| Number | Country | Date |
|---|---|---|
| 313,426 | Great Britain | June 10, 192 |

OTHER REFERENCES

Ostromyslenski, "J. Soc. Chem. Ind.," vol XXXV, No. 1 (1916), pages 69 and 70. (Copy in Scientific Library).

Ostromisslensky, Chem. Abs., 8, 1965. (Copy in Division 6).

Ostromysslenski, et al., J. Russ. Phys. Chem. 4 123-33 (1914). (Patent Office Library; also in 260–681).